United States Patent [19]

Kvols

[11] Patent Number: 5,516,225
[45] Date of Patent: May 14, 1996

[54] CORNER CONNECTOR AND MOLDING THEREFOR

[76] Inventor: Kevin Kvols, 2817 Janitell Rd., Colorado Springs, Colo. 80906

[21] Appl. No.: 237,777

[22] Filed: May 4, 1994

[51] Int. Cl.⁶ ........................................ F16B 7/18
[52] U.S. Cl. ..................... 403/170; 403/231; 403/205; 403/176; 312/265.1
[58] Field of Search ..................... 403/169–178, 403/230, 231, 295, 401, 403, 205, 382; 52/287.1, 288.1, 716.3, 716.4, 280; 312/140, 265.1, 265.4; 108/180, 190, 153

[56] References Cited

U.S. PATENT DOCUMENTS

| | | | |
|---|---|---|---|
| 2,904,360 | 9/1959 | Gamlen | 403/172 X |
| 4,413,570 | 11/1983 | Haigh | 108/153 |
| 4,678,359 | 7/1987 | Keen | 403/170 |
| 4,687,366 | 8/1987 | Wahlin | 403/295 X |
| 4,747,248 | 5/1988 | Fahs | 403/401 X |
| 4,928,470 | 5/1990 | Perez | 52/280 X |
| 5,011,323 | 4/1991 | Liuo | 403/172 |
| 5,265,972 | 11/1993 | Bahr | 403/230 X |
| 5,345,737 | 9/1994 | Latchinian | 403/172 X |

FOREIGN PATENT DOCUMENTS

| | | | |
|---|---|---|---|
| 226496 | 6/1987 | European Pat. Off. | 312/265.4 |
| 2728021 | 1/1979 | Germany | 403/231 |
| 3009010 | 9/1981 | Germany | 403/205 |
| 371570 | 10/1963 | Switzerland | 403/217 |
| 1427213 | 3/1976 | United Kingdom | 403/230 |

*Primary Examiner*—Kenneth J. Dorner
*Assistant Examiner*—Harry C. Kim
*Attorney, Agent, or Firm*—Richard W. Hanes

[57] ABSTRACT

A connector assembly for releasably interconnecting a plurality of elongated hollow bodies at an angle to each other, comprising a rigid connector element having a central base portion and a plurality of mutually angular legs extending from the base portion, a plurality of partitions or partial partitions carded by the base portion, each partition having an opening for receiving a shank type of fastener and further including at least one elongated hollow body, a boss integral with and disposed within the interior of the hollow body for receiving the shank of a fastener which is received in the opening in the partition.

1 Claim, 3 Drawing Sheets

CORNER CONNECTOR AND MOLDING THEREFOR

The present invention relates to apparatus for making corner interconnections for hollow molding and shaped counter top edging members.

BACKGROUND OF THE INVENTION

Counter tops, work surfaces, shelving and the like which is constructed from flat rigid material usually calls for decorative or protective edging. In many cases the edging is more than decorative or protective, it actually has structural value in supporting the flat construction materials. Such a material may, on its permanently exposed face for example, resemble a quarter round trim strip with mutually perpendicular flat back sides. In such case, the flat back sides of the strip would be made to attach to and thereby structurally interconnect the edges of perpendicularly intersecting planar pieces of a structure, such as the top and depending side members of a counter top. Because such strips or edging materials are not subject to bending around corners, some means must be provided to interconnect the trim strips at the corners and to provide an aesthetical pleasing corner appearance. The interconnection of three mutually perpendicular edging strips of the kind described is not uncommon and presents an even more difficult problem.

The problem is partially dealt with by the disclosure in U.S. Pat. No. 4,687,366 to Wahlin. This inventor describes a three-legged connecting piece for interconnecting hollow quarter round type of metal edging which is called "profile" in the patent specification. Each of the three legs project from a central base and are adapted to be inserted into the hollow interior of one of the pieces of edging. Each of the legs has the appearance of a piece of pointed channel iron where the point is formed by cutting the channel on a slope with respect to the line of intersection of the perpendicular planes forming the channel. The sloping surfaces of the sides of each projecting leg act as a ramp for a wedge member which is drawn up the ramp by screw means. When being drawn by the screw, the wedge member is wedged tightly between the ramp surface of the leg and the inside surface of the profile to secure the leg within the edging member. This type of securement is not efficient from a time and cost standpoint and may not, in all cases, result in a solid permanent connection.

It is therefore the primary object of the present invention to provide a means for interconnecting two or three piece mutually perpendicular edging assemblies with multi-legged connector pieces by a simple threaded fastener which is easily accessible for installation and removal.

A second object of the invention is to provide a cooperating cover cap for the base of the connection device which will cooperate with the above mentioned interconnecting means and the edging members to enhance the appearance of the corner connection and provide visual continuity through the connection.

Other and further objects, features and advantages of the invention will become apparent upon a reading of the following description of a preferred form of the invention, taken in connection with the accompanying drawings in which.

DETAILED DESCRIPTION OF A PREFERRED FORM OF THE INVENTION

Figure 1:
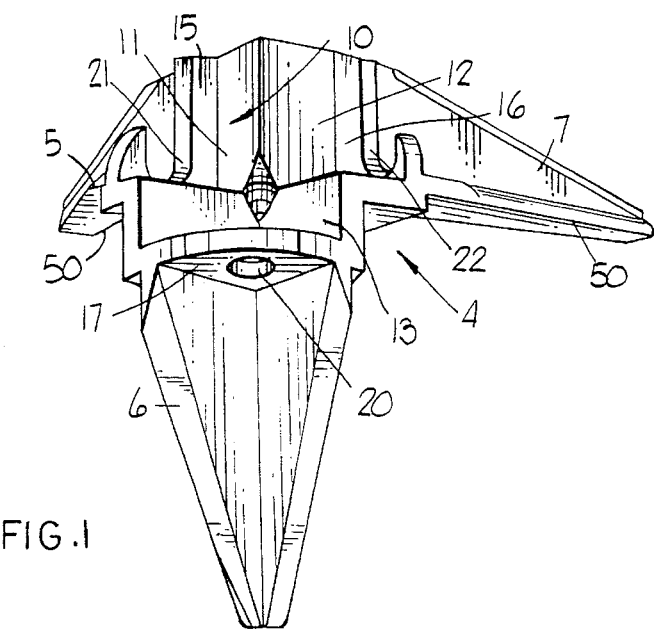
FIG. 1 is a low angle perspective view of a three legged connector of the present invention for making an outside corner connection of edging members.
Figure 2:
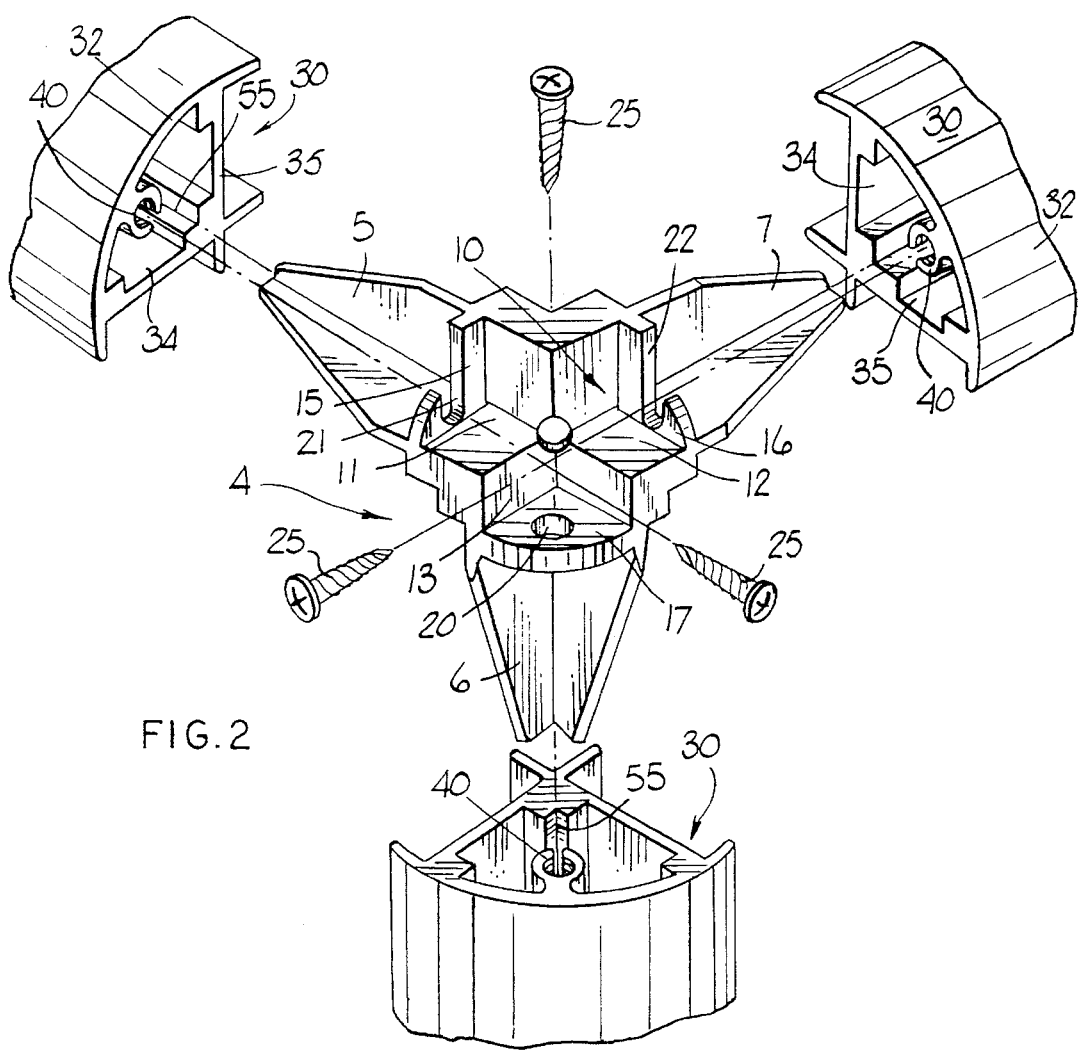
FIG. 2 is a high angle perspective exploded view of the three legged outside corner connector of the present invention with fragmentary views of the cooperating edging members.

Referring first to FIG. 1 of the drawings a three legged connector piece 4 is shown. Three mutually perpendicular legs 5, 6, and 7 are integrally formed with a common base member 10. The common base member 10 comprises three fragmented blocks of material 11, 12, and 13 each of which has two perpendicularly intersecting faces. The blocks are joined together in the casting along the edges of their perpendicular faces. Integral with each of the three blocks is a partial wall portion 15, 16 and 17, each of which contains either an aperture 20 or a slot 21 and 22 for accepting the shank of a threaded fastener 25, as seen in FIG. 2.

One form of extruded type of edging material is shown in the drawings and is indicated generally by reference numeral 30. This form of edging comprises a rounded exteriorly facing curved surface 32, which is approximately one quarter of a circle, having radially disposed walls 34 and 35 which are joined at the center of the circle of which the curved surface 32 would be the circumference. Located symmetrically about the center of an imaginary plane which bisects the right angle formed by the intersection of the walls 34 and 35 is a continuous cylindrically shaped boss 40, integrally formed with the inside of the curved edging surface 32.

Figure 3:
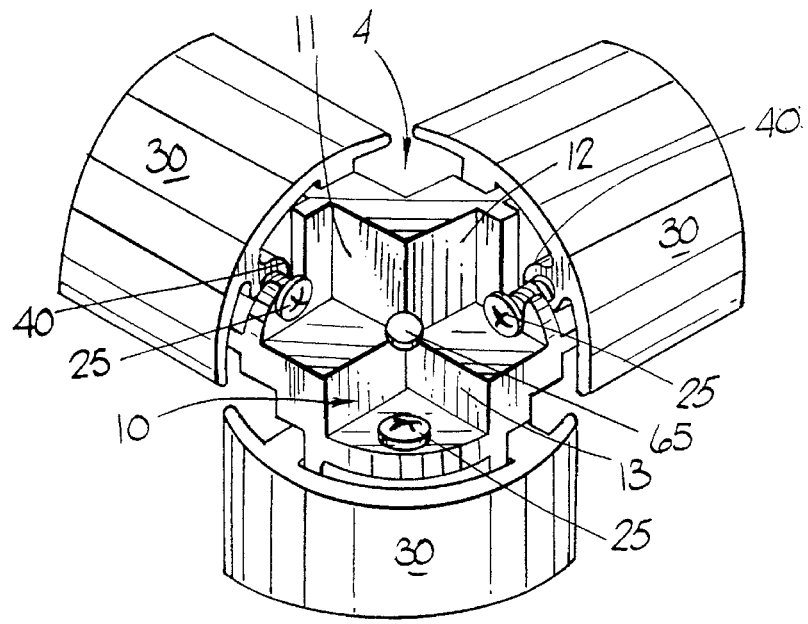
FIG. 3 is a high angle perspective view of a three legged corner assembly in assembled condition but without the decorative and protective cap.

In making the corner interconnection of the three edging pieces the legs 5, 6, and 7 are inserted into the hollow interior of each of the edging extrusions with the corner 50 of each leg nested conformingly into the inside corner 55 formed along the interior of the intersection of the two extrusion walls 34 and 35. When a connector leg is fully inserted into the edging extrusion the partial wall portion of the connector base containing the threaded fastener slot or aperture comes into flush engagement with the flat face of the boss 40. The securing connection is then made between the connector leg and the edging extrusion by inserting a threaded fastener into the slot or aperture and then screwing it into the boss. The completed connection is shown in FIG. 3.

Figure 4:
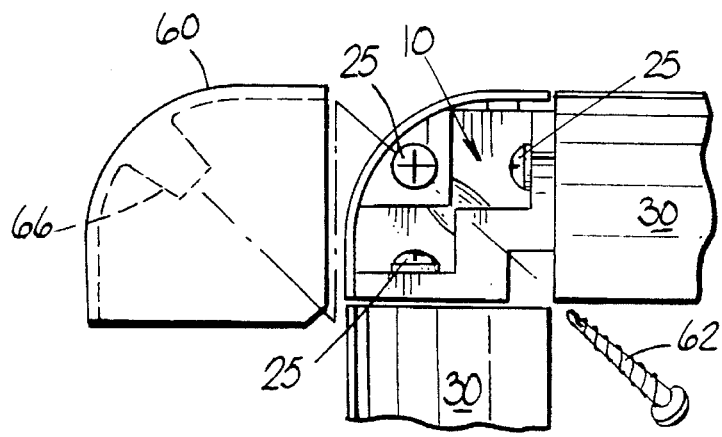
FIG. 4 is a top and partially exploded view of the corner assembly showing the cap member and the threaded fastener which secures the cap member to the central base portion of the connection member.
Figure 5:
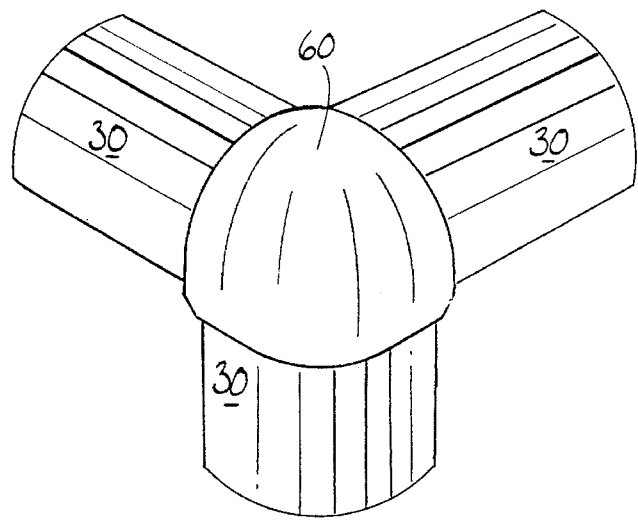
FIG. 5 is a high angle perspective view of the assembled edge members with the decorative and protective cap in place.
Figure 6:
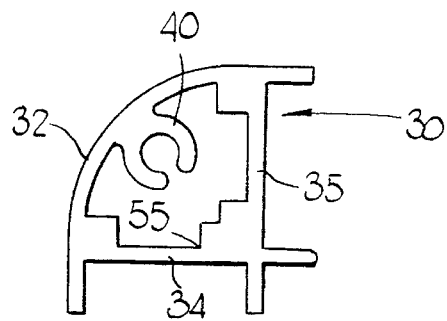
FIG. 6 is a cross sectional view of an edging member of the present invention which cooperates with the central connection member.

A partially spherical cap member 60 is shown in FIGS. 4 and 5. The cap covers the exposed interior of the connection seen in FIG. 3. To secure the cap 60 to the assembly a screw 62 or similar fastener is inserted through an aperture 65 in the center of the base 10 of the connector from the inside and threadingly engages a protruding boss 66 located on the interior of the cap 60. The completed assembly is shown in FIG. 5.

Figure 7:
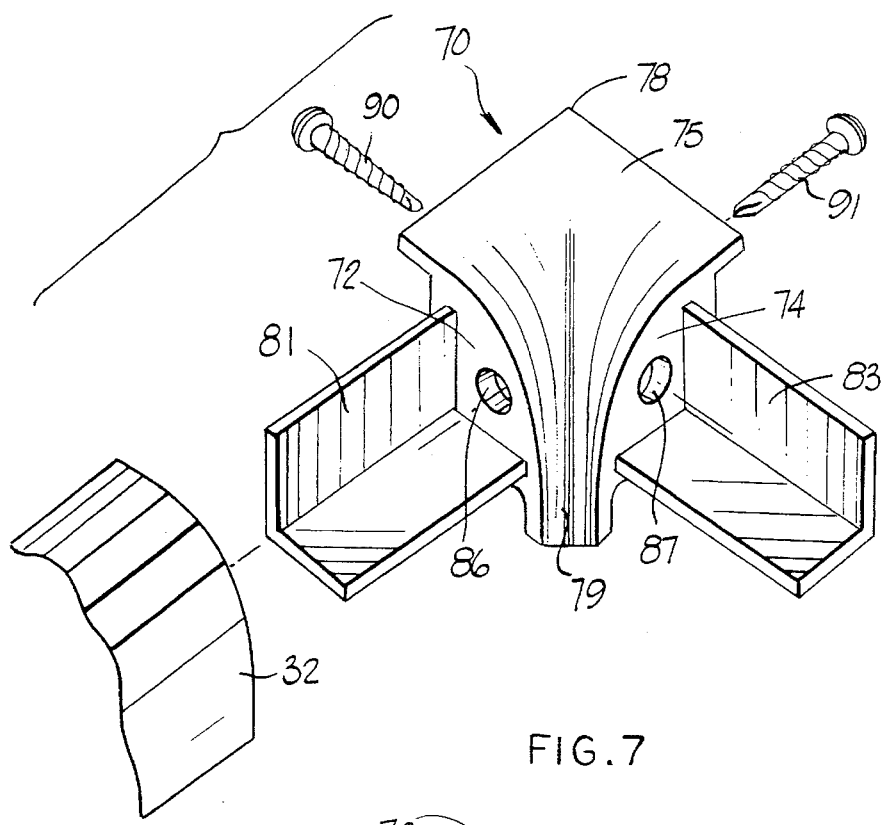
FIG. 7 is a high angle perspective exploded view of a central connecting member provided to connect edging which meets at an inside corner.
Figure 8:
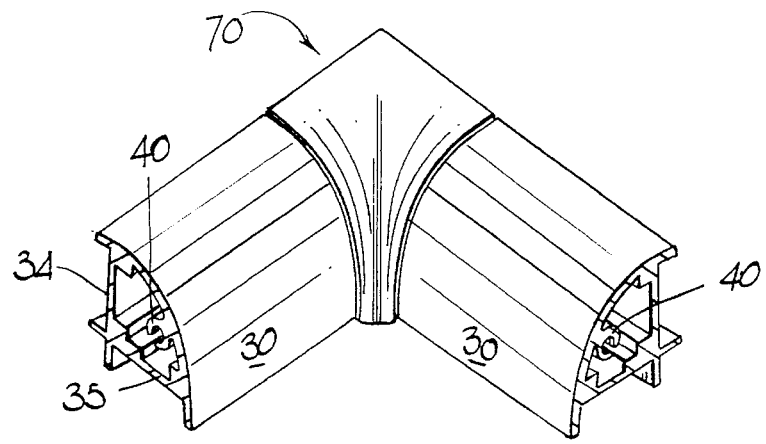
FIG. 8 is a high angle perspective view of an inside corner where the edging members are interconnected by the connection member of the present invention.

The fastening boss 40 of the extruded edging is also compatible with an interior corner connector 70, as pictured in FIGS. 7 and 8. The inside corner connector may be constructed of two perpendicular walls 72 and 74 which are interconnected by a shaped decorative top portion 75 which tapers from a rectangular conforming corner portion 78 to a compressed or folded inside corner 79. Each of the connector walls 72 and 74 are attached to a rigid angle piece 81 and 83. Each of the walls also contains an aperture 86 and 87 for receiving a fastener 90 and 91 respectively.

The inside corner connection is made by inserting the angles 81 and 83 into the hollow interior of each of the edging extrusions with the corner 50 of each leg nested conformingly into the inside corner 55 formed along the interior of the intersection of the two extrusion walls 34 and 35. When a connector angle is fully inserted into the edging extrusion, the partial wall portion 34 or 35 of the connector base comes into flush engagement with the flat face of the extrusion's boss 40. The securing connection is then made between the connector angle and the edging extrusion by inserting a threaded fastener into the aperture and on into the boss.

I claim:

1. A corner connector assembly comprising:

a plurality of elongated edge molding pieces, each of said edge molding pieces having a longitudinal axis and a hollow interior defined by first and second walls perpendicularly oriented with respect to each other and a third wall, said first and second walls being interconnected along one of the edges of the first and second walls to form an inside corner and the other edges of the first and second walls being connected to the respective edges of the third wall to enclose the hollow interior of the molding piece, said third wall including a monolithically formed elongated boss protruding into the hollow interior of the molding piece;

a connector element, said connector element comprising a central base portion and a plurality of elongated legs extending from said central base portion, each of said elongated legs being angularly oriented with respect to each other and being adapted to be inserted into the hollow interior of the respective one of said plurality of edge molding pieces, said each elongated leg comprising two walls perpendicularly oriented with respect to each other for mating with said first and second perpendicularly oriented walls of said respective edge molding piece, said connector element further comprising a plurality of partial walls, each of said partial walls being disposed between said central base portion and said each elongated leg, said each partial wall having an opening and being perpendicularly oriented with respect to said two walls of the respective elongated leg, a plurality of fasteners, each of said fasteners having a head end and a threaded shank, said head end of the fastener being received and held by said opening of the respective partial wall and said threaded shank being secured within the elongated boss of the respective molding piece for securing the elongated legs to the respective molding pieces.

\* \* \* \* \*